United States Patent [19]

Wong et al.

[11] Patent Number: 4,708,990

[45] Date of Patent: Nov. 24, 1987

[54] ANIONIC POLYMERIZATION PROCESS

[75] Inventors: Pui K. Wong, Katy; Dale L. Handlin, Jr., Houston, both of Tex.

[73] Assignee: Shell Oil Company, Houston, Tex.

[21] Appl. No.: 875,823

[22] Filed: Jun. 18, 1986

[51] Int. Cl.$^4$ .................... C08F 36/00; C08F 136/00
[52] U.S. Cl. .................... 525/250; 525/289; 525/297; 525/331.9; 525/333.3; 525/338; 525/383; 525/271; 526/281
[58] Field of Search ............... 525/271, 250, 289, 297, 525/331.9, 333.3, 387, 338; 526/281

[56]  References Cited

U.S. PATENT DOCUMENTS

| | | | |
|---|---|---|---|
| 4,340,690 | 7/1982 | Lol et al. | 525/271 |
| 4,540,763 | 9/1986 | Kirchhoff | 526/281 |
| 4,642,329 | 2/1987 | Kirchhoff | 526/284 |

FOREIGN PATENT DOCUMENTS 193721 10/1986 European Pat. Off. .
WO-05032/85 11/1985 PCT Int'l Appl. .

OTHER PUBLICATIONS

Tan et al., 1985 ACS Meeting, Chicago, Sep. 8–13, 1985, ACS Polymer Preprint 1985, 26(2), 178.
Arnold et al., 31st Int. SAMPE Symposium, Apr. 7–10, 1986, Preprint 1986, 968–976.
Tan et al., 1986 ACS Meeting, Apr. 13–18, 1986, ACS Polymer Preprint 1986, 27(1), 453–4.
Klundt, Chem. Rev. 1970, 70(4), 471, Research Disclosure 268008.
Boekelheide et al., Tetrahedron Lett. 1978, 4245–8.
Boekelheide, Topics in Current Chem. 193, 113, 100–4.
Perkins et al., Angew. Chem. Int. Ed. Engl. 1978, 17(8), 615–6.
Ewing et al., J. Chem. Soc., Chem. Commun. 1979, 207.
Gray et al., J. Am. Chem. Soc. 1978, 100, 2892–3.
Harruff et al., J. Am Chem. Soc. 1978, 100, 2893–4.
Aalbersberg, Tetrahedron Lett. 1979, 22, 1939–42.
Hubert et al., J. Chem. Soc. 1965, 3160.
DeCamp et al., Tetrahedron Lett. 1974, 40, 3575–8.

*Primary Examiner*—Wilbert J. Briggs, Sr.
*Assistant Examiner*—David W. Woodward

[57]  ABSTRACT

The present invention is directed to a process for preparing polymers which may be coupled (reacted) at temperatures above about 200° C., the process comprising first reacting monomer(s) selected from conjugated dienes and monoalkenyl arenes with an organomonolithium initiator and then reacting the resulting polymeric arms (P-Li) with certain arylcyclobutene monomers. These arylcyclobutene monomers have the formula

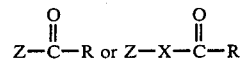

where X is an alkylene or arylene group, Z is an arylcyclobutene group, R is selected from the group consisting of aryl groups, alkyl groups,

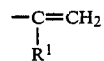

and H, and R$^1$ is an aryl group or alkyl group.

16 Claims, No Drawings

ANIONIC POLYMERIZATION PROCESS

FIELD OF THE INVENTION

The present invention is directed to a novel process for preparing polymers of monoalkenyl arenes and/or conjugated dienes. More particularly, the present invention is related to a novel process for preparing polymers of monoalkenyl arenes and/or conjugated dienes by end capping such living polymers with certain derivatives of benzocyclobutene.

BACKGROUND OF THE INVENTION

Block copolymers have been developed rapidly within the recent past, the starting monomers usually being monoalkenyl arenes such as styrene or alphamethyl styrene block polymerized with conjugated dienes such as butadiene and isoprene. A typical block copolymer of this type is represented by the structure polystyrene-polybutadiene-polystyrene. When the monoalkenyl arene blocks comprise less than about 55% by weight of the block copolymer, the product is essentially elastomeric. Moreover, due to their peculiar set of physical properties they can be referred to more properly as thermoplastic elastomers. By this is meant polymers which in the melt state are processable in ordinary thermoplastic processing equipment but in the solid state behave like chemically vulcanized rubber without chemical vulcanization having been effected. Polymers of this type are highly useful in that the vulcanization step is eliminated and, contrary to scrap from vulcanized rubbers, the scrap from the processing of thermoplastic elastomers can be recycled for further use. Such block copolymers may also be hydrogenated to produce polymers having improved oxidative stability, along with other improved properties.

Triblock or multiblock copolymers such as S-B-S or S-EB-S have a balance of high tensile strength and low modulus that makes them excellent materials for applications such as adhesives, footwear and blending with other thermoplastics and thermosets. Properties such as creep, hysteresis and tensile strength improve as molecular weight increases for triblock copolymers. However, production is also increasingly difficult as molecular weight increases because solution viscosity increases markedly with molecular weight and time required for polymerization increases. As the time in the reactor increases, impurities and thermal termination cause more chains to be prematurely terminated. Therefore, it would be advantageous to make triblock copolymer and multiblock copolymers by coupling diblock molecules of one half the final molecular weight (or less in the case of stars) after the polymer has been finished in the plant. Furthermore, most of these polymers are sold as a component for blending. Therefore, a convenient place for coupling would be in the extruder during blending.

A new process has now been discovered that permits the production of such block copolymers in a more efficient manner.

SUMMARY OF THE INVENTION

The present invention relates broadly to a novel process for preparing copolymers of monoalkenyl arenes and/or conjugated dienes by use of an arylcyclobutene derivative. In particular, the present invention relates to a process for preparing a polymer which may be coupled at temperatures above about 200° C., said process comprising:

(a) solution polymerizing one or more monomers selected from the group consisting of conjugated dienes and monoalkenyl arenes under polymerization conditions at a temperature between about −75° C. and +150° C. with an organomonolithium compound, therein forming living polymeric arms; and (b) contacting the solution containing said living polymeric arms with an effective amount of an arylcyclobutene monomer of the formula

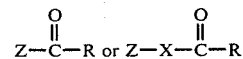

where X is an alkylene or arylene group, Z is an arylcyclobutene group, R is selected from the group consisting of aryl groups, alkyl groups,

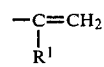

and H, and $R^1$ is an aryl group or alkyl group, therein forming BCB capped polymeric arms.

In a further embodiment, the present invention relates to a process for preparing a polymer which may be coupled at temperatures above about 200° C., said process comprising:

(a) solution polymerizing one or more monomers selected from the group consisting of conjugated dienes and monoalkenyl arenes under polymerization conditions at a temperature between about −75° C. and +150° C. with an organomonolithium compound, therein forming living polymeric arms;

(b) contacting the solution containing said living polymeric arms with an effective amount of an arylcyclobutene monomer of the formula

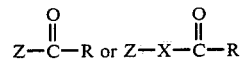

where X is an alkylene or arylene group, Z is an arylcyclobutene group, R is selected from the group consisting of aryl groups, alkyl groups,

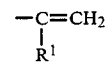

and H, and $R^1$ is an aryl group or alkyl group, therein forming BCB capped polymeric arms; and (c) contacting the resulting polymer with hydrogen and a hydrogenation catalyst under hydrogenation conditions and at a temperature between about −75° C. and +150° C., therein reducing by hydrogenation at least about 80% of the aliphatic unsaturation of the polymeric arms while reducing less than 20% of the aromatic unsaturation.

ADVANTAGES OF THE INVENTION

There are a number of possible advantages to the present invention. With the present invention it may be possible to produce higher molecular weight polymers having improved creep resistance, elasticity, strength, low permanent set and improved blending capability (with other polymers).

It may also be possible with the present invention to debottleneck production plants and improve efficiency. For example, using conventional coupling agents, a limiting factor is the solution viscosity after coupling. However, with the present invention "coupling" does not occur until the polymer is heated above about 200° C. Accordingly, higher solids levels can be maintained in the polymerization (coupling) reactors, and actual coupling can be delayed until polymer recovery (e.g. in an extruder) or even later times.

Further, with BCB terminaed diblocks, one might be able to have diblock rheology in the first zone of an extruder and triblock rheology at the exit of the extruder. Such a combination might prove very beneficial for blending and interpenetrating network formation.

DETAILED DESCRIPTION OF THE INVENTION

The preferred group of acyclic conjugated dienes that can be polymerized into the polymer chain P are those containing 4–8 carbon atoms. Examples for such dienes are 1,3-butadiene, 2,3-dimethyl-1,3-butadiene, piperylene, 3-butyl-1,3-octadiene, isoprene, 2-phenyl-1,3-butadiene.

Monoalkenyl arenes that can be polymerized together with the dienes to form the polymer chain P preferably are those selected from the group of styrene, the methylstyrenes, particularly 4-methylstyrene, the propylstyrenes, particularly 4-propylstyrene, vinylnaphthalene, particularly 1-vinylnaphthalene, cyclohexylstyrenes, particularly 4-cyclohexylstyrene, p-tolylstyrene, and 1-vinyl-5-hexylnaphthalene.

The polymer chains P can be homopolymers of the diene monomers defined or can be copolymers of diene monomers and monoalkenyl-substituted aromatic monomers. These copolymers, in turn, can be random or tapered copolymers, as well as block copolymers of these various monomers. The presently preferred monomers are isoprene, 1,3-butadiene and styrene. The present preferred polymer chains P are those in which the conjugated dienes are present in a major amount and the monovinyl-substituted arenes are present in a minor amount.

The presently preferred polymer is one that is obtained by end-capping (according to the present invention) a living lithium metal-terminated polymer selected from the group consisting of homopolymers of alkadienes having 4 to 12 carbon atoms and copolymers of at least one diene of 4 to 12 carbon atoms.

The molecular weight of the polymers of this invention can vary in broad ranges. For the usual applications of the coupled polymers, the number average molecular weight will be in the range of about 6,000 to about 2,000,000.

Those polymers in which the polymer chain P has a structure A—B— so that B is attached to the end-capping agent (of the present invention), and in which A represents a block of monoalkenylarenes, preferably a polystyrene block, and B represents a block that confers rubbery properties to the polymer chain, such as a polydiene block, a copolymer block of a diene and a monoalkenyl-substituted arene, or a combination of such blocks constitutes a presently preferred polymer. Such a polymer exhibits properties both of an elastomer and of a thermoplastic polymer. Therefore, such polymers can be formed into articles by standard procedures known for producing articles from thermoplastic polymers while the finished article exhibits elastomeric properties.

Furthermore, specific polymers constituting preferred embodiments of this invention are those obtained by reactions and procedures disclosed in detail in the following description of a process to make these polymers.

In accordance with a further embodiment of this invention, there is provided a process for producing the polymer as defined above. This process includes basically two steps (as a minimum). The first step is the step in which a living polymer having the formula P-Li is produced. The second step is that in which the living polymer is further reacted with the arylcyclobutene derivative as defined further below.

The first step of this process is carried out by reacting a mono-functional lithium metal initiator system with the respective monomer or monomers to form the living polymer chain P-Li. This polymerization step can be carried out in one step or in a sequence of steps. In the case where the polymer chain P is a homopolymer or a random or tapered copolymer of two or more monomers, the monomers are simultaneously polymerized with the lithium metal initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this invention. These monomers are also preferred for the process of the present invention.

The lithium metal-based initiator systems used in the first step of the process to make the coupled polymers of this invention are based on lithium having the general formula R'Li wherein R' is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexylbutyllithium. The amount of the organo lithium initiator employed depends upon the desired properties of the polymer, particularly the desired molecular weight. Normally, the organomonolithium initiator is employed in the range of about 0.1 to 100 gram millimoles per 100 grams of total monomers.

The polymerization reaction is carried out in the presence of a hydrocarbon diluent or solvent. Preferably the hydrocarbon diluent is a paraffinic, cycloparaffinic or aromatic hydrocarbon having 4–10 carbon atoms or a mixture of such diluents. Examples for the diluent are n-hexane, n-heptane, 2,2,4-trimethylpentane, cyclohexane, benzene and toluene. The reaction is generally carried out with a weight ratio of diluent to monomers exceeding 1. Preferably the diluent is employed in a quantity between about 400 to about 1500 parts by weight per 100 parts by weight of total monomers. In one embodiment, a minor amount (0.1 to 10% by volume) of a polar compound is added to the diluent. Specific examples of polar compounds include dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-di-methoxyethane, dioxane, paraldehyde, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylamine, pyridine, quinoline, N-ethylpiperidine, N-methyl-N-ethylaniline, N-methylmorpholine, and the like. It is to be understood also that mixture of polar compounds can be employed in the practice of the instant invention. A preferred polar compound is diethylether. In the case where the polymer chain P is a homopolymer or a random or tapered copolymer of two or more monomers, the monomers are simultaneously polymerized with the organo lithium initiator. In the case where the polymer chain P is a block copolymer comprising two or more homo- or copolymer blocks, these individual blocks can be generated by incremental or sequential monomer addition.

The polymerization reaction in step 1 usually occurs within a period of time ranging from a few minutes up to about 6 hours. Preferably, the reaction is carried out within a time period of about 10 minutes to about 2 hours. The polymerization temperature is not critical but must be below the temperature at which the arylcyclobutene is activated and will generally be in the range of about −75° to about 150° C., preferably in a range of about 40° to about 90° C.

At the conclusion of the polymerization, the P-Li polymeric arms are contacted with an arylcyclobutene monomer of the formula $$Z-\overset{O}{\underset{\|}{C}}-R \text{ or } Z-X-\overset{O}{\underset{\|}{C}}-R$$

where X is an alkylene or arylene group, Z is an arylcyclobutene group, R is selected from the group consisting of aryl groups, alkyl groups,

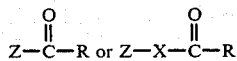

and H, and $R^1$ is an aryl group or alkyl group.

Preferred alkylene and alkyl groups have 1 to 6 carbon atoms. Examples are methylene (methyl), ethylene (ethyl), propylene (propyl) and butylene (butyl) groups. Preferred arylene and aryl groups are phenylene (phenyl) groups.

Z in the formula may be any arylcyclobutene group. An arylcyclobutene refers here to an aryl group which contains one or more cyclobutene rings fused to an aromatic ring. An aryl group refers to any aromatic moiety as defined previously. Preferred aromatic moieties include benzene, naphthalene, phenanthrene, anthracene, biaryl moeities or two or more aromatic moieties joined by an alkyl or cycloalkyl group. Examples of 2 or more joined aromatic moieties are diphenyl alkanes, and diphenyl cycloalkanes. Benzene is the most preferred aromatic moeity.

For the arylcyclobutene group Z, the aromatic moiety ring may be non-substituted or substituted with a wide variety of substituents. For use here, however, such substituents must be stable to the reaction conditions employed and not subject to side reactions. Examples of such substituents include but are not limited to, lower alkyl, e.g. methyl, ethyl, butyl; aryl, e.g., phenyl, tolyl; halo, eg. chloro, bromo, iodo; and lower alkoxy e.g., methoxy, ethoxy.

Preferably, the arylcyclobutene is a non-substituted cyclobutene ring and a non-substituted aromatic moiety. The most preferred embodiment of arylcyclobutene group Z is benzocyclobutene.

In a much preferred embodiment the arylcyclobutene monomer has the formula

where Z is benzocyclobutene and R is hydrogen, i.e. 4-formylbenzocyclobutene.

The amount of benzocyclobutene monomer employed is 1 to 3 mmols per mmol of the organolithium initiator. The temperature of contacting is typically the same as polymerization, i.e., −75° C. to 150° C.

After contacting with the arylcyclobutene monomer (resulting in BCB end-capped polymer arms), the polymer may be recovered by treating the reaction mixture with terminating agents containing active hydrogens such as alcohols or water or aqueous acid solutions or mixtures thereof. It is usually preferred to add an antioxidant to the reaction mixture before isolation of polymer.

The polymer is separated from the reaction mixture by standard techniques, such as steam stripping or coagulation with a suitable nonsolvent such as an alcohol. The coagulated or stripped polymer is then removed from the resulting medium by, e.g., centrifugation or extrusion. Residual solvent and other volatiles can be removed from the isolated polymer by heating, optionally under reduced pressure or in a forced air flow.

If desired the polymer (P-Li) may be hydrogenated prior to recovery.

Hydrogenation of the block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds. Preferred block copolymers are those where at least 99% of the aliphatic double bonds are hydrogenated while less than 5% of the aromatic double bonds are hydrogenated.

With regard to block copolymers of the general formula (A—B—) Y where Y is the arylcyclobutene end-capping agent, the average molecular weights of the individual blocks will vary within certain limits. In most instances, the monoalkenyl arene blocks will have number average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements. The proportion of the monoalkenyl arene blocks should be between about 8 and 65% by weight of the block copolymer, preferably between about 10 and 40% by weight.

A key aspect of the present invention is that the BCB end-capped polymer can be heated to temperatures above about 200° C., wherein dimerization and oligomerization of BCB is activated to give higher molecular weight coupled products.

The following figure shows the various steps in the present invention and the final polymer as recovered.

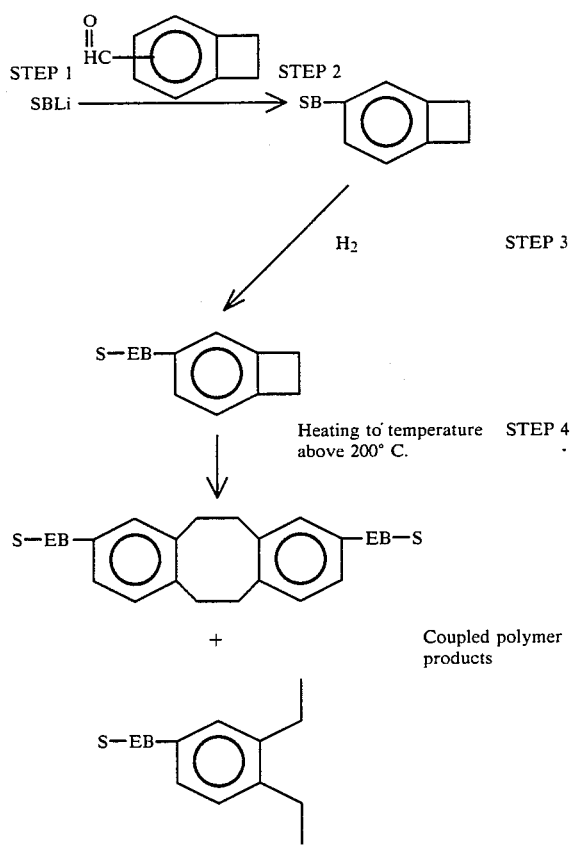

To illustrate the instant invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT I

A key aspect of the present invention deals with the ring-opening of the benzocyclobutene monomers to reactive o-quinodimethanes. In this embodiment, half-life values for the parent benzocyclobutene are calculated and summarized in the following Table 1, based on activation parameters reported in W. R. Roth et al Chem. Ber. III, 3892–3903 (1978). The results suggest that reactive oligomers and polymers containing benzocyclobutenes which are not substituted at the cyclobutene ring would have long shelf-life and good reactivity at 200°–250° C.

TABLE 1

| Benzocyclobutene $\xrightarrow{k}$ o-quinodimethane | | |
|---|---|---|
| T (°C.) | k (sec$^{-1}$) | t ½ (hr) |
| 25 | 2.5 × 10$^{15}$ | 7.6 × 10$^{10}$ |
| 100 | 1.7 × 10$^{-9}$ | 1.1 × 10$^{5}$ |
| 150 | 9.6 × 10$^{-7}$ | 2 × 10$^{2}$ |
| 200 | 1.4 × 10$^{-4}$ | 1.4 |

TABLE 1-continued

| Benzocyclobutene $\xrightarrow{k}$ o-quinodimethane | | |
|---|---|---|
| T (°C.) | k (sec$^{-1}$) | t ½ (hr) |
| 250 | 7.8 × 10$^{-3}$ | 2.5 × 10$^{-2}$ |

ILLUSTRATIVE EMBODIMENT II

In Illustrative Embodiment II, coupled polymers are prepared by using 4-formylbenzocyclobutene as the arylcyclobutene monomer.

Preparation of 4-formylbenzocyclobutene

To a hot solution of hexamethylene tetramine (14 g) and sodium iodide (16 g) in 140 g of ethanol was added 4-chloromethylbenzocyclobutene (15.2 g) with stirring. After standing at ambient temperature for 2–3 h, the mixture was diluted with 150 ml of water and then heated at reflux for 2 h. The resulting mixture was steam distilled and the distillate was extracted three times with ether. The combined ether extract was washed with water, dried over magnesium sulfate, and fractionally distilled to give 4-formylbenzocyclobutene: $^1$H NMR (CDCl$_3$) δ 3.17 (s, 4), 7.15 (d, 1), 7.51 (s, 1), 7.67 (d, 1) and 9.86 ppm (s, 1).

Preparation of Benzocyclobutene-capped Polystyrene

To a solution of styrene (50 g) in cyclohexane (500 ml) was added s-butyl lithium (3.3 mmol). After heating at 60° C. for 4 h, the orange polystyryl lithium was titrated with a solution of 4-formylbenzocyclobutene in cyclohexane until the orange color disappearaed. The product was isolated by precipitation from isopropanol and dried in vacuo at 65° C. to give 33 g of a white powder. GPC analysis of the product showed three polystyrene peaks with the following distribution of peak MW and % peak area: 10,300 (79%), 18,700 (20%), and 29,000 (1%). The formation of higher MW polystyrenes were probably due to the presence of oxygen or unidentified impurities in the endcapping solution which induced coupling of the living polystyryl lithium.

Coupling of Benzocyclobutene-capped Polystyrene at 250° C.

A sample of benzocyclobutene-capped polystyrene synthesized in the above example was subjected to isothermal dynamic shear in a Rheometric mechanical spectrometer at 250° C. for 30 min. GPC analysis showed that the amount of coupled polystyrene (dimers, trimers, tetramers, etc.) increased from 21% to 58% after heat treatment. Identical heat treatment of a hydrogen-capped polystyrene showed no increase of coupled polystyrene.

What is claimed is:

1. A process for preparing a polymer which may be coupled at temperatures above about 200 C., said process comprising:

(a) solution polymerizing one or more monomers selected from the group consisting of conjugated dienes and monoalkenyl arenes under polymerization conditions at a temperature between about −75 C. and +150 C. with an organomonolithium compound, therein forming a living polymer P-Li; and (b) contacting the solution containing said living polymer P-Li with an effective amount of arylcyclobutene monomer end-capping agent having the formula

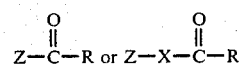

where X is an alkylene or arylene group, Z is an arylcyclobutene group, R is selected from the group consisting of aryl groups, alkyl groups, $$-\underset{R^1}{C}=CH_2$$

and H, and $R^1$ is an aryl group or alkyl group, therein forming an arylcyclobutene end-capped polymer.

2. The process of claim 1 wherein said arylcyclobutene monomer is

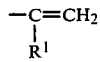

where Z is benzocyclobutene group.

3. The process of claim 2 wherein R is hydrogen.

4. The process of claim 1 wherein said conjugated diene is selected from the group consisting of butadiene, isoprene and mixtures thereof, and where said monoalkenyl arene is styrene.

5. The process of claim 1 wherein the amount of arylcyclobutene monomer is between 1 and 3 moles per mole of said organomonolithium compound.

6. A process for preparing a polymer which may be coupled at temperatures above about 200 C., said process comprising:
(a) solution polymerizing one or more monomers selected from the group consisting of conjugated dienes and monoalkenyl arenes under polymerization conditions at a temperature between about −75 C. and +150 C. with an organomonolithium compound, therein forming a living polymer P-Li; and
(b) contacting the solution containing said living polymer P-Li with an effective amount of arylcyclobutene monomer end-cappling agent having the formula

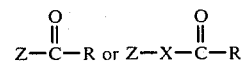

where X is an alkylene or arylene group, Z is an arylcyclobutene group, R is selected from the group consisting of aryl groups, alkyl groups, $$-\underset{R^1}{C}=CH_2$$

and H, and $R^1$ is an aryl group or alkyl group, therein forming an arylcyclobutene end-capped polymer; and
(c) contacting the resulting polymer with hydrogen and a hydrogenation catalyst under hydrogenation conditions and at a temperature between about −75 C. and +150 C., so as to reduce by hydrogenation at least about 80% of the aliphatic unsaturation of the polymeric arms while reducing less than 20% of the aromatic unsaturation and forming an hydrogenated polymer.

7. The process of claim 6 wherein said arylcyclobutene monomer is

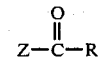

where Z is a benzocyclobutene group.

8. The process of claim 7 wherein R is hydrogen.

9. The process of claim 6 wherein said conjugated diene is selected from the group consisting of butadiene, isoprene and mixtures thereof, and where said monoalkenyl arene is styrene.

10. The process of claim 6 wherein the amount of arylcyclobutene monomer is between 1 and 3 moles per mole of said organomonolithium compound.

11. The process of claim 1 which further comprises heating the arylcyclobutene end-capped polymer to a temperature above about 200 C. and producing a coupled polymer.

12. The process of claim 6 wherein said hydrogenated polymeric arms are heated to a temperature of above about 200° C., therein resulting in a coupled polymer.

13. The polymer produced by the process of claim 11.

14. The polymer produced by the process of claim 12.

15. An arylcyclobutene end-capped polymer prepared by the process of claim 1.

16. An arylcyclobutene end-capped polymer prepared by the process of claim 6.

* * * * *